United States Patent
Nishimura

(10) Patent No.: US 12,352,843 B2
(45) Date of Patent: Jul. 8, 2025

(54) SYSTEM AND METHOD FOR EMULATING DIFFUSE TARGETS

(71) Applicant: Keysight Technologies, Inc., Santa Rosa, CA (US)

(72) Inventor: Ken A. Nishimura, Fremont, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 1273 days.

(21) Appl. No.: 17/097,373

(22) Filed: Nov. 13, 2020

(65) Prior Publication Data

US 2025/0164628 A1  May 22, 2025

Related U.S. Application Data

(60) Provisional application No. 63/046,301, filed on Jun. 30, 2020.

(51) Int. Cl.
| | | |
|---|---|---|
| *G01S 13/42* | (2006.01) | |
| *G01S 7/40* | (2006.01) | |
| *G01S 13/34* | (2006.01) | |
| *G01S 13/931* | (2020.01) | |

(52) U.S. Cl.
CPC ............ *G01S 13/34* (2013.01); *G01S 7/4004* (2013.01); *G01S 7/4052* (2013.01); *G01S 13/931* (2013.01)

(58) Field of Classification Search
CPC ...... G01S 13/34; G01S 7/4004; G01S 7/4052; G01S 13/931
See application file for complete search history.

(56) References Cited

U.S. PATENT DOCUMENTS

| | | | |
|---|---|---|---|
| 4,625,209 A | 11/1986 | Lawrence et al. | |
| 4,644,357 A | 2/1987 | Schaaf et al. | |
| 2018/0306904 A1* | 10/2018 | Vacanti | G01S 7/4056 |

FOREIGN PATENT DOCUMENTS

| | | |
|---|---|---|
| CN | 104614713 B | 5/2015 |
| CN | 109001697 A | 12/2018 |
| JP | 2010230549 A | 10/2010 |

OTHER PUBLICATIONS

U.S. Appl. No. 16/867,804, filed May 6, 2020.
English translation of abstract for CN109001697A.
English translation of abstract for JP2010230549A.
English translation of abstract for CN104614713B.

* cited by examiner

*Primary Examiner* — Timothy A Brainard

(57) ABSTRACT

A system and method are provided for emulating an echo signal reflected from a diffuse target, having an indeterminate shape and range in a radar environment, in response to a frequency-modulated continuous-wave (FMCW) radar signal transmitted by a radar under test. The method includes receiving the FMCW radar signal from the radar under test, the FMCW radar signal having radar signal frequencies linearly modulated between a first frequency and a second frequency; generating a bandlimited noise-like signal having frequencies within predetermined frequency limits, and a spectral shape such that amplitudes of the noise-like signal vary in a predetermined manner with respect to the frequencies; mixing the noise-like signal with the received FMCW radar signal to provide an emulated echo signal reflected from the diffuse target; and transmitting the emulated echo signal of the diffuse target to the radar under test.

20 Claims, 4 Drawing Sheets

SYSTEM AND METHOD FOR EMULATING DIFFUSE TARGETS

CROSS-REFERENCE TO RELATED APPLICATION

The present application claims priority under 35 U.S.C. § 119(e) to U.S. Provisional Application No. 63/046,301 filed on Jun. 30, 2020. The entire disclosure of U.S. Provisional Application No. 63/046,301 is specifically incorporated herein by reference in its entirety.

BACKGROUND

Advanced driver-assistance systems (ADASs) and autonomous driving systems for vehicles rely on detection and ranging systems that use detection and ranging electromagnetic signals, including millimeter wave radar signals, for example. The radar signals are used to warn of forward collisions and backward collisions, to implement adaptive cruise control and autonomous parking, for example, and ultimately to perform autonomous driving on streets and highways. The radar signals are intended to be used under various types of weather conditions.

Conventional automotive radar systems typically have multiple transmitters and receivers on the vehicle. Actual driving environments in which the radar systems may be deployed can vary greatly, and many such driving environments may be complex. For example, actual driving environments may contain numerous objects, some of which may objects encountered in actual driving environments have complicated reflection, diffraction and multi-time reflection characteristics that affect echo signals responsive to the radar signals. The immediate consequences of incorrectly sensing and/or interpreting echo signals may be that false warnings or improper reactions are triggered or warnings or reactions that should be triggered are not, which in turn can lead to collisions.

Emulation of targets for radar testing is desirable, since operating a vehicular radar in the actual environment may be dangerous, inefficient, expensive, and difficult to control. Generally, conventional radar target emulators attempt to emulate the physics of the problem. For example, a conventional radar target emulator may receive a radar signal transmitted from a radar under test, delay the radar signal by an amount corresponding to propagation delay resulting from range to the target, scaling amplitude of the radar signal to account for the range and radar cross section (RCS) of the target, and then retransmitting the scaled and delayed signal back to the radar under test, thereby emulating the transmission of the radar signal from the radar under test to the target and reflection of a corresponding echo signal. Conventional emulators work for a small number of targets. However, as the number of targets increases to N, an emulator must create N copies of the received radar signal, where each of the N copies is delayed by a different amount corresponding to the range of each respective target, becoming very computationally complex. The task is made more difficult by the frequency range in which most automotive radars operate.

Further, comprehensive testing of automotive radar in addition requires emulation of real-life interference with radar signals attempting to locate traditional targets. For example, automotive radar encounters precipitation, road clutter, and the like, which may be referred to as diffuse targets, that must be dealt with in discerning more traditional targets (e.g., point targets), such as other automobiles, pedestrians, road hazards, and the like. Emulation of precipitation, for example, presents a unique challenge. Precipitation, for example, results in a large number of scattering centers in the radar field of view. One effect of these scattering centers is increased attenuation of radar signals and corresponding echo signals from the traditional targets. Due to the large number of scattering centers caused by precipitation, emulating the actual reflection of the radar signal back from each of these scattering centers is very difficult. Although each scattering center is small, during heavy precipitation, there are a large number of scattering centers and the integrated reflectivity can be significant (which is in fact the basis for weather radar). Unlike a traditional target, which can be modeled to first order by a point reflection, precipitation is comprised of the superposition of numerous (e.g., thousands or even millions) scattering centers. As such, there is no distinct range associated with reflection due to precipitation. Emulating such a target by the copy and delay method outlined above quickly becomes unwieldy.

Similarly, emulation of the road surface (including road clutter) is extremely difficult using conventional radar emulators. The road surface is effectively a large planar surface that has a texture with roughness on the order of the wavelength of a radar signal at 77 GHz. Again, this results in a large number of scattering centers over a relatively large area within the field of view of the radar, resulting in the reflected signals from scattering centers being across a continuum of ranges.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
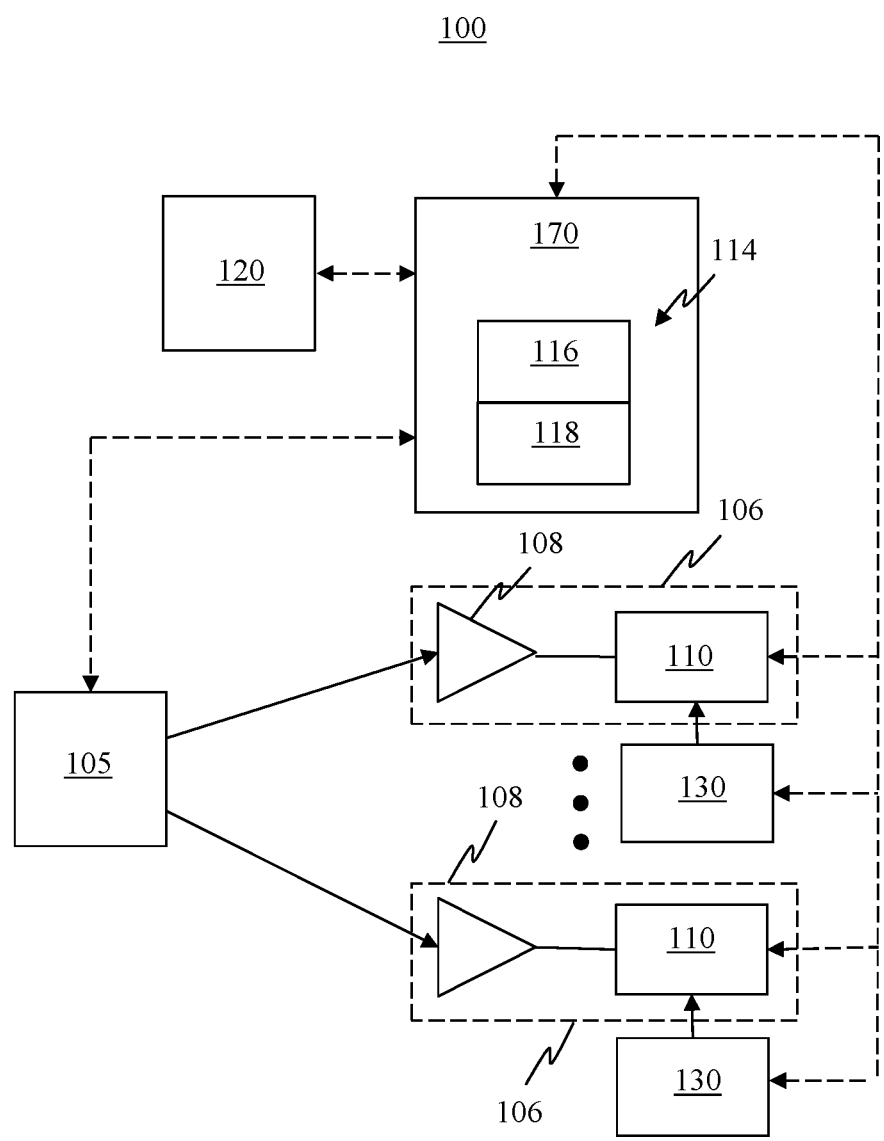
FIG. 1 is a simplified block diagram showing a system for emulating echo signals for a radar under test, using a frequency offset device, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative
embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a drive emulation system is able to emulate echo signals from emulated targets responsive to radar signal transmissions from a radar under test, arranged on a vehicle under test, such as an automobile or other mobile platform. The embodiments provide for an emulating echo signal reflected from a diffuse target (or volume target) comprising a multitude of scattering centers. Generally, a diffuse target is a collection of scattering centers distributed within the field of view of the radar under test, where the collection of scattering centers is defined by its extents or boundaries, density, positional and relative velocity distribution, and statistics of reflectivity parameters. The diffuse target may have an indeterminate shape and range in a radar environment. The echo signals may only be from one or more diffused targets, or may be combined with emulated echo signals from one or more non-diffused targets as well, such as traditional point targets. The emulated echo signals are responsive to a frequency-modulated continuous-wave (FMCW) radar signal transmitted by the radar under test. The scattering centers in the diffuse target individually would have small individual radar cross sections (RCSs), but are numerous, so collectively the scattering centers are significant in the operation of the radar under test. Examples of diffuse targets include precipitation, road clutter and foliage, or other volume targets in which the positions and velocities of the scattering centers can be represented by a statistical distribution rather than individual positions and locations.

According to a representative embodiment, a system is provided for emulating echo signals reflected from a diffuse target in response to an FMCW radar signal transmitted by a radar under test, where the FMCW radar signal has frequencies linearly modulated between a first frequency and a second frequency. The system includes a frequency offset transceiver, a signal generator and a controller. The frequency offset transceiver includes a receiver configured to receive the FMCW radar signal from the radar under test, a transmitter configured to transmit a return signal to the radar under test, and a mixer. The signal generator is configured to generate a noise-like signal having frequencies within a predetermined band limit, and having a spectral shape such that amplitudes of the noise-like signal vary in a predetermined manner with respect to the frequencies and to provide a frequency offset signal comprising the noise-like signal, where the mixer of the frequency offset transceiver mixes the FMCW radar signal and the frequency offset signal to provide the return signal. The return signal includes an emulated echo signal of the diffuse target, where the emulated echo signal of the diffuse target has a spectral shape comprising a convolution of the spectral shape of the noise-like signal and the spectral shape of the FMCW radar signal. The controller is programmed to control the signal generator to generate the noise-like signal based on desired characteristics of the diffuse target.

According to a representative embodiment, a method is provided for emulating echo signals reflected from emulated targets, including a diffuse target having numerous scattering centers, in response to an FMCW radar signal transmitted by a radar under test. The method includes receiving the FMCW radar signal from the radar under test, the FMCW radar signal having radar signal frequencies linearly modulated between a first frequency and a second frequency; generating a noise-like signal having frequencies within predetermined frequency limits, and a spectral shape such that amplitudes of the noise-like signal vary in a predetermined manner with respect to the frequencies, for emulating the diffuse target; providing a frequency offset signal based on at least the noise-like signal; mixing the frequency offset signal with the received FMCW radar signal to provide a return signal comprising an emulated echo signal reflected from the diffuse target; and transmitting the return signal to the radar under test.

FIG. 1 is a simplified block diagram showing a system for emulating echo signals for a radar under test, using a frequency offset device, according to a representative embodiment. As will be appreciated by one of ordinary skill in the art having the benefit of the present disclosure, one likely vehicular radar is automobile radar used in various capacities in current and emerging automobile applications. However, it is emphasized that the presently described echo signal emulation system is not limited to automobile radar systems, and can be applied to other types of vehicles that could employ a vehicular radar system, including trucks, busses, motorcycles, bicycles, motorized bicycles (e.g., scooters), and aircraft, for example.

Referring to FIG. 1, the echo signal emulation system 100 is arranged to test a radar under test 105, and includes multiple re-illuminators 106. Each of the re-illuminators 106 includes at least one re-illumination antenna 108 and at least one frequency offset transceiver 110, which may be a modulated reflection device (MRD), for example. Each transceiver 110 generally includes a receiver for receiving the FMCW radar signal, a mixer or other frequency offset device for mixing an offset signal with the FMCW radar signal, and a transmitter for transmitting an echo signal from one or more emulated targets. There may be one re-illuminator 106 for each emulated target in the scene emulation, including diffuse targets including a collection of scattering centers and more traditional non-diffuse targets (e.g., point targets). Alternatively, one re-illuminator 106 may be used for multiple emulated targets, including one or more diffuse targets and/or one or more non-diffuse targets. In an embodiment, the re-illuminators 106 may be arranged in a 2-D array, where each re-illuminator 106 represents an element in the 2-D array. In this case, the elements having a spatial position that corresponds to an emulated target would generate an emulated echo signal corresponding to that target.

In an embodiment, the system 100 may further include a diffractive optical element (DOE) for directing the radar signal to the re-illuminators 106, respectively, as described in U.S. patent application Ser. No. 16/867,804 to Gregory S. Lee, filed May 6, 2020, which is incorporated herein by reference in its entirety. The system 100 is configured to receive FMCW radar signals from the radar under test 105, which has one or more radar transmitters and corresponding transmit antennas, as well as one or more radar receivers and corresponding receive antennas.

In addition, each re-illuminator 106 of the system 100 has an associated signal generator 130 configured to generate arbitrarily complex signals. The signal generators 130 may be included in the re-illuminators 106, or they may be implemented separately. Also, although each re-illuminator 106 is shown as having a corresponding signal generator 130, it is understood that multiple re-illuminators 106 may share a signal generator 130, where the shared signal generator 130 may be configured to provide different signals. In an embodiment, each signal generator 130 may be implemented as a direct digital synthesizer (DDS), for example, configured to generate the arbitrarily complex signals in the digital domain, and to convert them to analog offset signals. The offset signals are mixed with the radar signal at the frequency offset transceiver 110, which provides an emulated echo signal at desired frequenc(ies) in accordance with the ranges of the corresponding targets, as discussed below. When one of the frequency offset transceivers 110 is used to emulate multiple targets, it sums multiple offset signals into a composite offset signal, the composite signal being mixed with the received FMCW signal in the frequency offset transceiver thereby generating a return signal comprising multiple emulated echo signals corresponding to the multiple targets, respectively.

For a single point target, the signal generator 130 generates an offset signal with one tone at a frequency corresponding to the range of the single point from the radar under test 105. For multiple single point targets, the signal generator 130 generates an offset signal with multiple tones at frequencies corresponding to the ranges of the multiple points. The offset signals that include one or more tones may be referred to as tone signals. For a diffuse target, the signal generator 130 generates a noise-like signal as an offset signal, such as a pseudo-random signal or a true random noise signal, containing multiple tones at frequencies representing various ranges of the scattering centers from the radar under test. For example, the signal generator may generate the noise-like signal in the digital domain using a pseudo-random sequence. The noise-like signal appears very similar to a large number of tones over a predetermined spectral range. The noise-like signal is then scaled in amplitude as a function of frequency by the signal generator 130, to represent the various effective reflectivities of the scattering centers in the diffuse target. Each signal generator 130 may provide different types (single tone, multiple tone, and pseudo-random) of offset signals at various frequencies (and amplitudes) to the frequency offset transceiver 110.

The system 100 is not exclusive to emulating point targets or diffuse targets, but rather can emulate both at the same time, e.g., to create complex drive scenarios that include one or more point targets among one or more diffuse targets. In such drive scenarios, the signal generator 130 generates tone signals corresponding to the respective point target(s), and also generates the noise-like signals to represent the diffuse target(s), as discussed above. These tone and noise-like signals may then be summed digitally and converted into a composite analog offset signal by the signal generator 130 for driving a mixer in one of the frequency offset transceivers 110, as discussed below with reference to FIG. 3.

Figure 2:
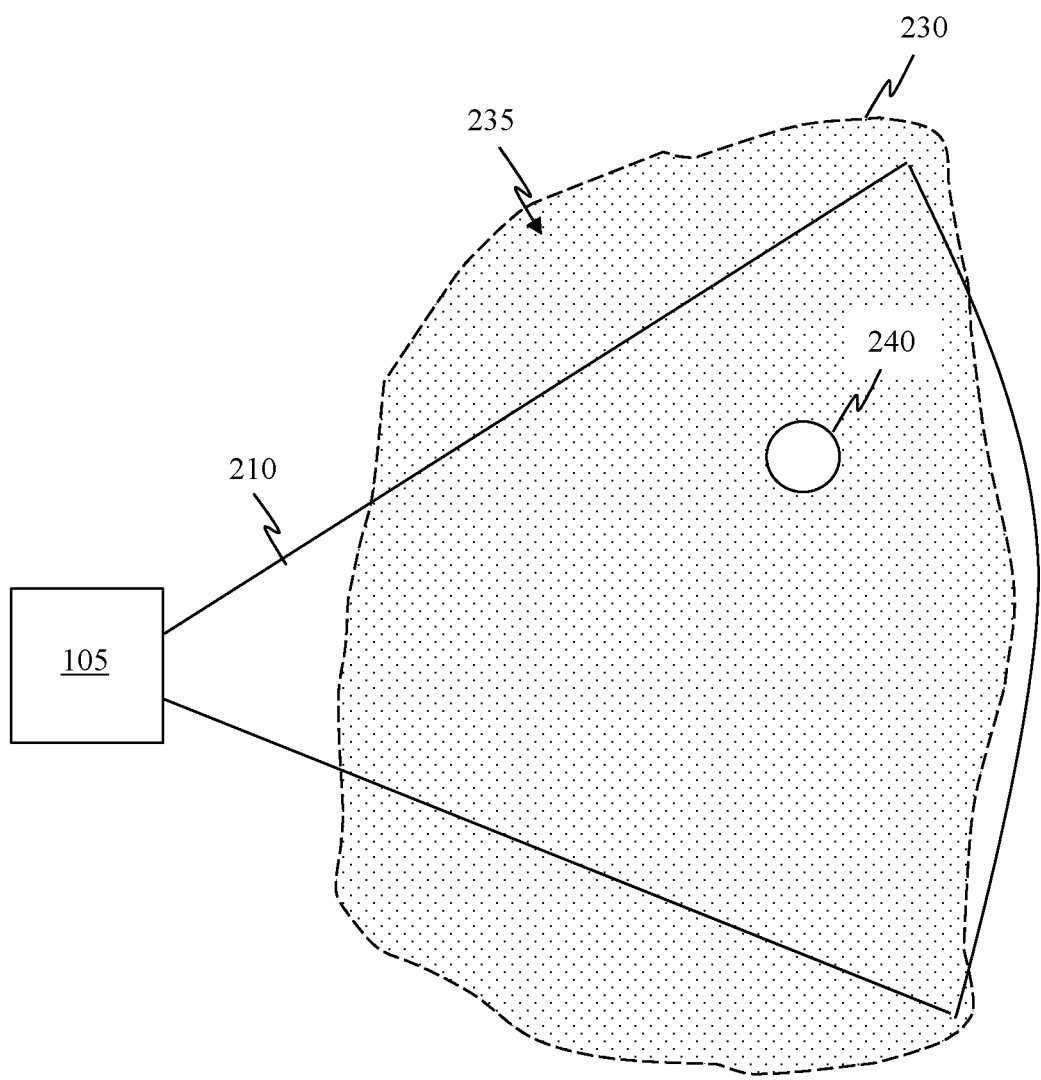
FIG. 2 is a schematic diagram of an illustrative drive scenario including diffuse and non-diffuse targets for testing a radar under test, according to a representative embodiment.

FIG. 2 is a schematic diagram of an illustrative drive scenario including diffuse and non-diffuse targets for testing a radar under test, according to a representative embodiment. Referring to FIG. 2, the radar under test 105 has a field of view 220 covered by the transmitted FMCW radar signal. Within the field of view 220 is a diffuse target 230, such as rain, and a non-diffuse target 240, such as an object in the roadway, for example. The diffuse target 230 includes numerous scattering centers 235, such as raindrops, that have very small individual RCSs that would provide weak reflected echo signals, respectively, responsive to the transmitted radar signal. The scattering centers 235 may be represented collectively with an integrated RCS, however, through emulation of an echo signal from the diffuse target 230, according to the embodiments discussed herein.

The system 100 also includes a computer 112 with a controller 114. The controller 114 described herein may include a combination of memory 116 that stores instructions and an illustrative processor 118 that executes the stored instructions in order to implement all or part of the processes described herein. A database 120 may store information to be used for target emulation, including various predetermined scenarios that have one or more diffuse targets (e.g., diffuse target 230), and optionally one or more non-diffuse targets (e.g., non-diffuse target 240). For example, the database 120 may store desired characteristics of the diffuse target, such as the peak density of the scattering centers in the diffuse target, the range from the radar under test 105 at which the peak density occurs, the range from the radar under test 105 at which the density of the scattering centers exceeds a predetermined first threshold, the range from the radar under test 105 at which the density of the scattering centers falls below a predetermined second threshold, and the uniformity of distribution of the scattering centers. The database 120 may further store information regarding parameters of the particular radar under test 105, such as codes, power, fields of view, and the like. The radar under test 105 may be connected to the computer 112 by various types of wired and/or wireless network connections. The controller 114 is configured to control operations of frequency offset transceivers 110, as well as the signal generators 130 via control signals, indicated by dashed lines.

The controller 114 may be housed within or linked to a workstation such as a computer or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling application of various principles as described in the present disclosure. The structural configuration of the controller 114 may include, but is not limited to, processor(s), computer-usable/computer readable storage medium(s), an operating system, application module(s), peripheral device controller(s), slot(s) and port(s), as discussed below.

Additionally, although the computer 112 and/or the controller 114 show components networked together, multiple components may be integrated into a single system. For example, the computer 112 and/or the controller 114 may be integrated with a display (not shown) and/or with the system 100. On the other hand, the networked components of the computer 112 and/or the controller 114 may also be spatially distributed such as by being distributed in different rooms or different buildings, in which case the networked components may be connected via data connections. In still another embodiment, one or more of the components of the computer 112 and/or the controller 114 is not connected to the other components via a data connection, and instead is provided with input and/or output manually such as by a memory stick or other form of memory. In yet another embodiment, functionality described herein may be performed based on functionality of the elements of the computer 112 and/or the controller 114 but outside the system 100.

In the depicted embodiment, the computer 112 includes the controller 114, which includes memory 116, processor 118, as well as user and/or network interfaces (not shown) and a display (not shown). The computer 112 and/or the controller 114 may be implemented as a processing unit. In various embodiments, the processing unit may include one or more computer processors (e.g., processor 118), digital signal processors (DSPs), central processing units (CPUs), field-programmable gate arrays (FPGAs), application specific integrated circuits (ASICs), or combinations thereof, using any combination of hardware, software, firmware, hard-wired logic circuits, or combinations thereof. Each of the computer 112, the controller 114 and/or the processor 118 may include its own processing memory (e.g., memory 116) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 4. That is, execution of the instructions/computer readable code generally causes the processing unit of the computer 112 and/or the controller 114 to emulate echo signals reflected from emulated radar targets in response to the radar signals transmitted by the radar under test 105.

The memory 116, and any other memory described herein, including the database 120, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings. The memory 116 and the database 120 may be representative of one or more memories and databases, as well as multiple memories and databases, including distributed and networked memories and databases.

Generally, in operation, the radar under test 105 emits RF radar signals (illustratively mm wave signals) that are focused at a respective one of the re-illumination antennas 108, which are beneficially comparatively high-gain antennas, of one of the re-illuminators 106. The re-illumination antenna 108 may be a horn antenna selected for the wavelength of signals received from the radar under test 105. The re-illumination antenna 108 may have a variable gain, and may be coupled to a beamshaping element, such as a lens to tailor a degree of freedom of an angle of arrival (AoA). Of course, other types of antennas, such as patch antennas or patch antennas arrays, may be incorporated as the re-illumination antenna 108, without departing from the scope of the present teachings.

In an embodiment, the system 100 may optionally include a diffractive optical element (DOE), as described in U.S. patent application Ser. No. 16/867,804 to Gregory S. Lee, mentioned above, in order to focus the radar signals at the re-illumination antennas 108. In this embodiment, the emitted radar signals are incident on a first side of the DOE, which diffracts the signals from the radar under test to be focused at a respective one of the re-illumination antennas 108. As such, the DOE diffracts the incident wave at a particular angle relative to a second side of the DOE, and each diffracted wave is focused on a respective one of the re-illumination antennas 108. Of course, the system 100 may include other means of focusing the radar signals at respective ones of the antennas 108, without departing from the scope of the present teachings. Notably, the respective focal points (alternatively foci) at each one of the re-illumination antennas 108 represents a target that is emulated by the system 100.

The radar signals incident on the re-illumination antennas 108 are provided to respective ones of the frequency offset transceivers 110. As described more fully herein, based on input from the controller 114, frequency shifting of the incident signals is effected in each of the frequency offset transceivers 110 and beneficially emulates a distance of a target from the radar under test 105, or a velocity of a target relative to the radar under test 105, or both. In addition, the azimuth (+x direction the coordinate system of FIG. 1) and the elevation (+z direction in the coordinate system of FIG. 1) are emulated by the re-illumination antennas 108. The re-illumination antennas 108 may be part of an electronically steerable antenna array of the re-illuminators 106. Alternatively, the re-illumination antennas 108 may be mechanically gimballed, may be mechanically moved, or may have a combination of mechanical gimballing/movement and electronic emulation. Likewise, the re-illuminators 106 may be mechanically moved, instead of or in addition to the antennas 108. The re-illuminated signals provided by the frequency offset transceivers 110 are incident on the radar under test 105. The computer 112 receives the signals from the radar under test 105 for further analysis of the accuracy of the radar under test 105.

Generally, a vehicular radar utilizing FMCW waveforms operates by transmitting a radio frequency (RF) radar signal in the 77 GHz band, for example. The radar signal is modulated such that the instantaneous frequency linearly changes from a first frequency to a second frequency over a predetermined time period, referred to as a chirp signal. The RF frequency may increase linearly (upchirp) over the predetermined time period, where the first frequency (e.g., 77 GHz) is less than the second frequency (e.g., 78 GHz), or the RF frequency may decrease linearly (downchirp) over the predetermined time period, where the first frequency (e.g., 78 GHz) is greater than the second frequency (e.g., 77 GHz). This linear ramp in frequencies is repeated to form a continuous wave signal that is transmitted from the radar.

The transmitted radar signal propagates at the speed of light towards a target, reflects from the target, and returns to the radar as a reflected echo signal, where the echo signal is delayed by the round trip time between the radar and the target. The length of this delay corresponds to a distance between the radar and the target. The echo signal is then mixed with a currently transmitted radar signal in the radar, an operation known as homodyne reception. A resulting intermediate frequency (IF) signal has a frequency equal to the instantaneous difference between the frequency of the received echo signal and the frequency of the currently transmitted radar signal at the radar.

That is, owing to the delay in the received echo signal and the linear ramp in frequencies of the transmitted radar signal over the predetermined time period, there will be a frequency difference between the currently transmitted radar signal (which has linearly changed in frequency) and the received echo signal (which is at the frequency of the originally transmitted radar signal). This frequency difference is therefore proportional to the roundtrip delay multiplied by the frequency sweep rate in Hertz per second (Hz/s). For example, since close targets are delayed less than distant targets, the close emulated targets will result in a smaller frequency difference and thus a lower IF signal frequency than more distant emulated targets. When the emulated target is a point target, the resultant IF signal will be a single tone at a single frequency. When the emulated target comprises multiple targets, the resultant IF signal has multiple tones with frequencies corresponding to the instantaneous ranges to respective targets. In the general case considering N targets, the IF signal at the radar will comprise N tones, the frequency of each tone corresponding to the range to a corresponding target and the amplitude of each tone corresponding to the relative received strength of echo signal from that target. Notably, the received strength is a function of range to the target from the radar, as well as reflectivity of the target per the target's RCS. For a given target RCS, the strength is generally inversely proportional to the range according to the function $1/R^4$, where R is the distance between the radar and the target.

In this context, the representative embodiments of the present disclosure utilize frequency offsets provided by the frequency offset transceivers 110 to emulate ranges to emulated targets from the radar under test 105. Using frequency offset, each emulated target is indicated by an effective frequency shift due to the propagation delay. However, rather than delaying transmission of the echo signal to indicate the range, the delay itself is emulated by the frequency offset transceiver imparting the expected frequency shift corresponding to the desired delay to the echo signal. For example, as discussed in more detail below, the radar signal transmitted from the radar under test 105 may be mixed at the frequency offset transceiver 110 by a frequency offset signal using a single-sideband (SSB) mixer. This frequency offset signal has a frequency (or pattern of frequencies) equal to the required frequency shift that would be present in the echo signal that corresponds to the delay (or round trip difference). Indeed, the frequency offset signal is exactly of the form of the desired IF signal at the radar under test 105 upon receiving the echo signal and mixing it with the currently transmitted radar signal. Thus, a single emulated target at a first range would result in an IF signal at the radar under test 105 comprised of a single tone with a frequency representing the range to the single target. This can be produced using the SSB mixer in the frequency offset transceiver 110 by using the desired IF signal as the frequency offset signal. Multiple emulated targets would result in an IF signal comprised of multiple tones. Utilizing this multi-tone IF signal as the offset signal thus results in an echo signal that emulates the multiple emulated targets.

Figure 3:
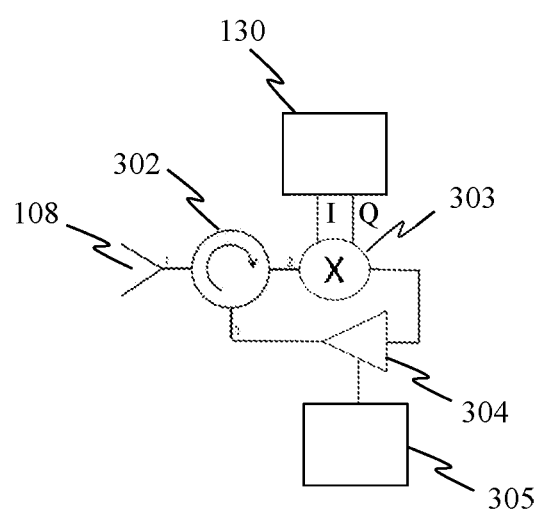
FIG. 3 is a simplified circuit diagram showing a frequency offset device of the echo signal emulation system, according to a representative embodiment.

FIG. 3 is a simplified circuit diagram of a representative frequency offset transceiver 110 of FIG. 1, implemented as illustrative MRD 310, in accordance with a representative embodiment. Aspects of the MRD 310 described in connection with the representative embodiments may be common to the frequency offset transceivers 110 and delay electronics described above, although they may not be repeated.

The MRD 310 is connected to a re-illumination antenna 108, described above. Of course, in practice, there may be more than one MRD 310 in a system, and thus more than one re-illumination antenna 108 (e.g., as depicted in the representative embodiment of FIG. 1). The MRD 310 comprises a circulator 302 connected to a mixer 303. The mixer 303 is an in-phase (I)-quadrature (Q) mixer (I-Q mixer), or I-Q modulator, which for reasons described below, is beneficially an SSB mixer, with standard 90 degrees phasing of the radar signal, resulting in an output of either the upper sideband (USB) or the lower sideband (LSB), rejecting the LSB or USB, respectively. Alternatively, the I-Q mixer 303 may be adapted for binary phase modulation (BPM), for example. The modulation is selected to provide the desired degree of approximation of the difference phase symbols. Notably, approximation of the amplitude may be carried out by the I-Q mixer 303 using techniques within the purview of one of ordinary skill in the art.

The output of the I-Q mixer 303 is provided to a variable gain amplifier (VGA) 304, which comprises a gain control input 305. As alluded to above, the gain control input 305 of the VGA 304 is connected to the computer 112. Notably, the VGA 304 enables proper emulation of the re-illuminated signal received from the radar under test 105 at the re-illumination antenna 108. Notably, the power of the re-illuminated echo signal from the re-illumination antennas 108 is an indication of the RCS of an emulated target, and of the emulated distance between the emulated target and the radar under test 105. As such, the gain provided by the VGA 304 is selected at the gain control input 305 based on the power of the radar signal incident on the re-illumination antennas 108, and the desired emulation distance of the emulated target.

Notably, control of the re-transmitted power is used to emulate a consistent RCS. The RCS may be stored in look-up in tables in the database 120, for example. To this end, for a given range R to an emulated target, it is known that magnitude (strength) of the return echo signal is proportional to RCS and falls as $1/R^4$. A vehicle is typically quoted as being 10 dBsm, which is measuring area, meaning 10 dB relative to a square meter (s.m.), or in plain English, 10 square meters. Many objects have been tabulated (vehicles, pedestrians, bicycles, buildings, etc.), and those that have not may be calculated these days by ray tracing techniques. By the present teachings, emphasis is placed on providing a return echo signal strength to the radar under test 105 that is commensurate with the distance R (obeying the well-known $1/R^4$ radar decay law) and the accepted value of RCS for the particular object. In accordance with a representative embodiment, the signal strength (and thus power) is adjusted by adjusting the strength of the I-Q drive signals from the computer 112 to the MRDs 310 of the various embodiments, with a weaker I-Q drive signal providing a comparatively weaker emulated echo signal. Notably, in certain representative embodiments, the computer 112 pre-computes the consistent return echo signal provided to the single point of focus at the radar under test 105, and the controller 114 then adjusts the strength of the I and Q drives to achieve this SSB strength. Alternatively, and beneficially, the gain of VGA 304 can be adjusted to control SSB strength of the return echo signal.

When the radar under test 105 is an FMCW device, the distance/velocity is emulated electronically using the MRD 310. To this end, FMCW radar systems use chirped waveforms, as discussed above, whereby the correlation of the original transmit (Tx) waveform from the radar under test 105 with the received (Rx) echo waveform reveals the target distance. For example, in upchirp/downchirp systems with chirp rates of $\pm k_{sw}$ (measured in Hz/s), a target at a distance d and zero relative velocity to the ego vehicle with the radar under test 105 will result in a frequency shift (δf) given by Equation (1), where c is the speed of light and the factor of 2 is due to the roundtrip propagation of the signal from the radar under test 105:

$$\delta f = \pm (2k_{sw}d/c) \qquad \text{Equation (1)}$$

The sign of the shift depends on which part of the waveform, upchirp vs. downchirp, is being processed. In contrast, Doppler shifts due to relative velocity manifest as "common mode" frequency shifts, e.g., a net upshift over both halves of the waveform indicates the radar under test is approaching closer to the target. Correlation is performed in the radar under test's IF/baseband processor; bandwidths of a few MHz are typical.

A commonly deployed variation of FMCW radar systems uses repetitive upchirps, or repetitive downchirps, but not both (with intervening dead times). As such, the distance to an emulated target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz to few tens of kHz.

Upon amplification/attenuation at the circulator 302, the MRD 310 provides an amplified/attenuated SSB signal that is returned to the circulator 302 and retransmitted out the re-illumination antenna 108. Notably, in the SSB MRD 310 of the representative embodiment, decreasing the strength of the modulation I and Q drive signals will decrease the output tone strength and thus decrease the RCS. In practice, this method likely will not achieve more than 15-20 dB of dynamic range by modulation drive alone. However, the VGA 304 makes up the deficit to achieve the desired RCS dynamic range, and 10-50 dB of variable gain can be readily achieved by a combination of variable attenuators and amplifier bias adjustment.

Figure 4:
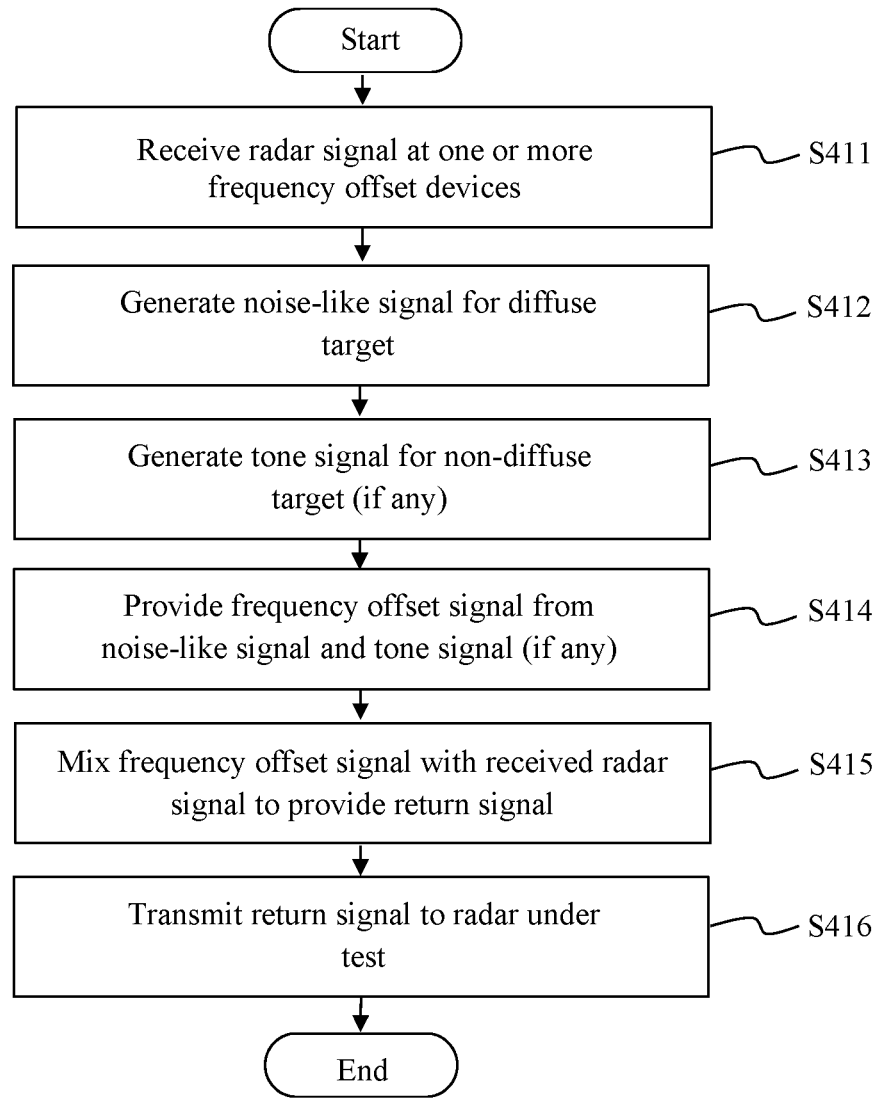
FIG. 4 is a simplified flow diagram showing a method for emulating echo signals reflected from diffuse targets and non-diffuse targets (if present), according to a representative embodiment.

FIG. 4 is a simplified flow diagram illustrating a method for emulating echo signals reflected from diffuse targets and non-diffuse targets (if present), according to a representative embodiment. The method may be implemented on the system 100, discussed above, for example.

Referring to FIG. 4, an FMCW radar signal is received from a radar under test (e.g., radar under test 105) at one or more frequency offset devices (e.g., frequency offset transceiver 110) in block S411. The FMCW radar signal has radar signal frequencies linearly modulated between a first frequency and a second frequency, as discussed above. The radar signal is modulated such that the instantaneous frequency linearly changes from the first frequency to the second frequency over a predetermined time period. The frequency may linearly increase (upchirp) or linearly decrease (downchirp) over the predetermined time period, without departing from the scope of the present teachings.

A noise-like signal is generated in block S412 for emulating a diffuse target. The noise-like signal has a predetermined band limit and may be generated, for example, by a signal generator (e.g., signal generator 130), such as a direct digital synthesizer. The frequencies of the noise-like signal lie within the predetermined band limit, and may be generated pseudo randomly, for example, although any technique for generating a noise-like signal, such as providing true random noise, for example, may be incorporated without departing from the scope of the present teachings. The predetermined band limits correspond to minimum and maximum ranges of the diffuse target from the radar under test, and are consistent with frequency values of the IFs provided by the radar under test using homodyne reception of the echo signals at these ranges, as discussed above.

For example, the IFs provided by the radar under test may vary between DC and about 10 MHz, the swept frequency of the FMCW chirp may be a few hundred MHz (e.g. 500 MHz), and the sweep time may be a few tens of microseconds (e.g. 50 µs). This means that the slope of the upchirp or the downchirp of the radar signal would be 10 MHz/µs in this example. Accordingly, an emulated target that is 100 feet (30 m) away would have a round trip time of 200 ns or 0.2 µs, resulting in an IF tone of 2 MHz. Similarly, an emulated target that is 50 feet (15 m) away would have a round trip time of 100 ns or 0.1 µs, resulting in an IF tone of 1 MHz, while an emulated target that is 150 feet (45 m) away would have a round trip time of 300 ns or 0.3 µs, resulting in an IF tone of 3 MHz. Although a diffuse target by definition does not have a specific range, the scattering centers of the diffuse target lie within span of ranges. Accordingly, when a uniform diffuse target lies within 50 feet and 150 feet from the radar under test, for example, the resultant predetermined band limit of the noise-like signal representing the diffuse target would range between 1 MHz and 3 MHz. Generally, lower frequencies represent scattering centers in a diffuse target closer to the radar under test, and higher frequencies represent scattering centers farther from the radar under test.

The noise-like signal also has a spectral shape, such that relative amplitudes of the offset signal vary in a predetermined manner with respect to the frequencies. The amplitude manipulation, or spectral shaping, may be performed by the signal generator. For example, a DDS includes a DSP that generates and manipulates signals in the digital domain and a digital-to-analog converter (DAC) that takes the digital data representing the signal and converts it to an analog output signal. The spectral shape of the noise-like signal represents the effects of the reflectivity of the diffuse target as a function of range. Generally, with regard to the predetermined manner in which the amplitudes vary, the amplitudes vary inversely with respect to the ranges to the scattering centers according to a function of $1/R^2$, where R is the distance to the scattering centers from the radar under test. As discussed above, the relationship between range and reflected power falls as a function $1/R^2$ for a diffuse target comprised of uniformly distributed scattering centers, as opposed to $1/R^4$ as would be expected for a non-diffuse target (e.g., a point target). Assuming a uniform density of scattering centers in the diffuse target, the number of scattering centers in a given differential range (dR) is proportional to $R^2$ for a given solid angle from the radar under test. That is, the number of scattering centers per steradian increases as the square of the range ($R^2$) as the volume occupied by the test volume is proportional to $R^2 dR$, and thus the integrated reflected power falls off as $R^2$.

Since frequency f of a frequency offset signal is indicative of range R, to emulate a uniform density of the scattering centers in the diffuse target, the desired spectral characteristics of the noise-like signal will include spectral density falling off as $1/f^2$, where f is instantaneous frequency of the noise-like signal. Thus, the amplitudes likewise vary inversely with respect to the frequencies of the noise-like signal, according to a function of $1/f^2$. As a result, larger amplitudes represent scattering centers in the diffuse target closer to the radar under test, indicating less path loss (shorter round trip distances) of the radar signal transmitted toward the diffuse target and the echo signal reflected from these closer scattering centers. Smaller amplitudes represent scattering centers farther from the radar under test, indicating a greater path loss (long round trip distances) of the radar signal transmitted toward the diffuse target and the echo signal reflected from these farther scattering centers.

Use of the noise-like signal recognizes that the diffuse target is comprised of a summation of many individual targets (scattering centers), each with its own range to the radar under test. If emulated separately, each scattering point would result in its own small offset tone and amplitude. However, since the summation of a large number of these tones would appear as noise, it may be accurately represented by the noise-like signal with the spectral shape, according to the embodiments herein. Starting with a randomly or pseudo-randomly generated noise signal and spectrally shaping it to emulate the diffuse target is substantially simpler computationally than attempting to emulate each scattering center separately with a tone of a certain frequency and amplitude, and then summing all the resultant tones, as would be required using conventional target emulation techniques, especially when the number of scattering centers is large. Also, for a large number of scattering centers in the diffuse target, the noise approximation of the various embodiments improves due to the statistics of a large number of random numbers.

Notably, because the diffuse target is a summation of a large number of individual points, there is no distinct phase, and therefore arbitrary phase of the emulated echo signal accurately represents the diffuse target. In comparison, use of offset signals to emulate non-diffuse targets, discussed below, requires phase of the offset signal to be controlled in order to accurately emulate velocity. So, phase is not a factor for emulating diffuse targets. Also, the frequencies and amplitudes of the noise-like signal may indicate overall density of the scattering points (e.g., light versus heavy precipitation), where more densely packed scattering points would generally result in greater signal attenuation (path loss) over the depth of the diffuse target. Variations in density of the diffuse target may be represented by adjusting the amplitude vs. frequency. For uniform scattering, the amplitude falls off as $1/f^2$, as discussed above. For example, when approaching a rainstorm, the scattering centers are denser at longer ranges, so the amplitude vs. frequency may be adjusted to not fall off as rapidly as $1/f^2$, thereby accounting for the higher density of scattering centers at the longer ranges.

In the event there is (optionally) a non-diffuse target to be emulated along with the diffuse target, an additional tone signal is generated in block S413, indicating the non-diffuse target. This tone signal may be generated, for example, by the same signal generator (e.g., signal generator 130) that generates the noise-like signal in block S412, or by a different signal generator. The non-diffuse target is assumed to be a traditional point target for purposes of illustration. Accordingly, the tone signal includes a tone having a frequency corresponding to the range of the emulated non-diffuse target from the radar under test, and an amplitude corresponding to the range and the RCS of the emulated non-diffuse target. The frequency of the tone is within the same predetermined frequency limits as the noise-like signal, which correspond to ranges from the radar under test, when the range of the non-diffuse target is within the range extent of the diffuse target. Otherwise, when the range of the non-diffuse target is outside the range extent of the diffuse target, the frequency of the tone will lie outside the predetermined frequency limits of the noise-like signal. The frequency is consistent with the frequency value of the IF provided by the radar under test using homodyne reception of the echo signals at these ranges, as discussed above. Generally, the amplitude varies inversely with respect to the range according to a function of $1/R^4$, where R is the distance to the non-diffuse target from the radar under test. Of course, the tone signal may include multiple tones at different frequencies corresponding to multiple diffuse targets, for example, depending on the drive scenario. Also, the noise-like signal and the tone signal may be generated in any order, or substantially simultaneously, without departing from the scope of the present teachings.

Also, the tone signal has phase that indicates a velocity of the point target in relation to the (moving) radar under test. Generally, the phase of the IF tone from one chirp to the next chirp is representative of the velocity of a target. So, for point targets, the phase of each of the tones in the tone signal is controlled to correspond to the velocity of each target represented by each of the tones.

In an embodiment, the amplitude of the non-diffuse target may also vary as a function of the location of the non-diffuse target relative to the diffuse target, as well as the density of the diffuse target. That is, when the radar signal passes through all or a portion of a depth of the diffuse target to reach the non-diffuse target, the portion of the diffuse target through which the radar passes may attenuate both the radar signal and the emulated echo signal. The larger the portion of the diffuse target through which the radar and echo signals pass, the greater the attenuating effect of the diffuse target.

Likewise, greater the density of scattering centers in the portion of the diffuse target through which the radar and echo signals pass, the greater the attenuating effect of the diffuse target. In an embodiment, density parameters from the diffuse target emulation may be used to adjust the path loss (effective RCS) of the non-diffuse target emulation to emulate attenuation.

In block S414, a frequency offset signal is provided, based on the noise-like signal generated in block S412 for the diffuse target and the tone signal (if any) generated in block S413 for the non-diffuse target. That is, when there is no non-diffuse target, the frequency offset signal is based only on the noise-like signal. When there is a non-diffuse target, the frequency offset signal is as a composite frequency offset signal comprised of the noise-like signal representing the diffuse target and the tone signal representing the non-diffuse target. For example, when the signal generator is a DDS, providing the frequency offset signal comprises simply converting to the analog domain the digitally generated noise-like signal to provide the frequency offset signal. When there is a non-diffuse target, in addition to the diffuse target, providing the frequency offset signal comprises summing the noise-like signal and the tone signal. When the signal generator is a DDS, for example, the noise-like signal and the tone signal may be digitally summed to provide a digital composite signal, which is converted the analog domain in order to provide the frequency offset signal.

In block S415, the frequency offset signal is mixed with the received FMCW radar signal using a SSB mixer (e.g., I-Q mixer 303) device to provide a return signal that includes an emulated echo signal from the diffuse target and, when present, an emulated echo signal from the non-diffuse target. The resulting emulated echo signal from the diffuse target includes frequency components of the FMCW radar signal that have been shifted by the frequencies of the tones generated in a noise-like (e.g., pseudo random or random) fashion at frequencies in the chirp frequency range of the radar signal from the radar under test (e.g., between 77 GHz and 78 GHz) having the spectral shape. Technically, multiplication in the time domain is equivalent to convolution in the frequency domain. So, the emulated echo signal of the diffuse target has a spectral shape comprising a convolution of the spectral shape of the noise-like signal and a spectral shape of the FMCW radar signal. The resulting emulated echo signal from the non-diffuse target includes the FMCW radar signal with frequency components that are shifted by the frequency of the tone corresponding to the non-diffuse target in the frequency offset signal. When there are multiple non-diffuse targets, the frequency offset signal will contain multiple tones corresponding to the non-diffuse targets and the resulting emulated echo signal will contain multiple instances of the FMCW radar signal with frequency components that are shifted by the frequency of corresponding tones in the frequency offset signal. In an embodiment, mixing the frequency offset signal with the received FMCW radar signal includes suppressing one of an upper mixing product or a lower mixing product from the SSB mixer. The lower mixing product is suppressed when the first frequency of the linearly modulated radar signal frequencies is greater than the second frequency (downchirp), and the upper mixing product is suppressed when the first frequency of the linearly modulated radar signal frequencies is less than the second frequency (upchirp). Of course, when there is no tone signal, only the noise-like signal from the diffuse target is provided as frequency offset signal.

In block S416, the return signal is transmitted to the radar under test. As discussed above, the radar under test includes homodyne receivers, one which mixes the received return signal with the radar signal currently transmitted from the radar under test to provide a corresponding IF signal. The IF signal has frequencies corresponding to the frequencies of the noise-like signal and amplitudes corresponding to the spectral shape of the noise-like signal, collectively indicating distances of the scattering points in the emulated diffuse target, corresponding to an emulated echo signal from the diffuse target. The IF signal also has a frequency tone corresponding to the frequency tone of the tone signal and an amplitude corresponding to the amplitude of the frequency tone of the tone signal, corresponding to an emulated echo signal from the non-diffuse target.

The process depicted in FIG. 4 is repeated while the radar under test is transmitting the radar signal, so that the radar under test continually receives emulated echo signals from the diffuse target and (optionally) from the non-diffuse target. For purposes of illustration, the process depicted in FIG. 4 assumes one diffuse target and one non-diffuse target. Of course, substantially the same process would apply to multiple diffuse targets, as well as to no or multiple non-diffuse targets, without departing from the scope of the present teachings.

Also, in the process depicted in FIG. 4, it is assumed that echo signals from the diffuse and non-diffuse targets are emulated using the same return signal. In this case, a signal generator from one frequency offset transceiver provides and sums the noise-like signal and the tone signal into a composite frequency offset signal, which the frequency offset transceiver mixes with the radar signal, and transmits back to the radar under test as a return signal. In an alternative process, the echo signals from the diffuse and non-diffuse targets are emulated using the separate return signal provided by separate frequency offset transceivers. In this case, a signal generator from one frequency offset transceiver provides the noise-like signal, which the frequency offset transceiver mixes with the radar signal, and transmits it back to a receiver of the radar under test as a first return signal. Likewise, a signal generator from another frequency offset transceiver provides the tone signal, which the frequency offset transceiver mixes with the radar signal, and transmits it back to another receiver of the radar under test as a second return signal.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for emulating echo signals reflected from a diffuse target in response to a frequency-modulated continuous-wave (FMCW) radar signal transmitted by a radar under test, the system comprising:
a frequency offset transceiver comprising a receiver configured to receive the FMCW radar signal from the radar under test, a transmitter configured to transmit a return signal to the radar under test, and a mixer, wherein the FMCW radar signal has frequencies linearly modulated between a first frequency and a second frequency; and
a signal generator configured to generate a noise-like signal having frequencies within a predetermined band limit, and having a spectral shape such that amplitudes of the noise-like signal vary in a predetermined manner with respect to the frequencies and to provide a frequency offset signal comprising the noise-like signal, wherein the mixer of the frequency offset transceiver mixes the FMCW radar signal and the frequency offset signal to provide the return signal, wherein the return signal includes an emulated echo signal of the diffuse target, and wherein the emulated echo signal of the diffuse target has a spectral shape comprising a convolution of the spectral shape of the noise-like signal and a spectral shape of the FMCW radar signal.

2. The system of claim 1, further comprising:
a controller programmed to control the signal generator to generate the noise-like signal based on desired characteristics of the diffuse target.

3. The system of claim 2, wherein the controller is programmed to vary amplitudes of the noise-like signal inversely with respect to the frequencies of the noise-like signal according to a function of $1/f^2$, $f$ being instantaneous frequency of the noise-like signal.

4. The system of claim 2, wherein the signal generator comprises a direct digital synthesizer (DDS).

5. The system of claim 4, wherein the DDS is configured to generate the noise-like signal in a digital domain using a pseudo-random sequence.

6. The system of claim 1, wherein the mixer comprises a single-sideband mixer configured to output only one of an upper mixing product or a lower mixing product of the FMCW radar signal and the frequency offset signal.

7. The system of claim 6, wherein the single-sideband mixer is configured to output the upper mixing product when the first frequency of the linearly modulated radar signal frequencies is greater than the second frequency, and
wherein the single-sideband mixer is configured to output the lower mixing product when the first frequency of the linearly modulated radar signal frequencies is less than the second frequency.

8. The system of claim 1, wherein the signal generator is further configured to generate a tone signal having a frequency tone within the predetermined band limit for emulating a non-diffuse target, and to sum the tone signal and the noise-like signal to provide the frequency offset signal, wherein the return signal further includes an emulated echo signal of the non-diffuse target.

9. A method of emulating echo signals reflected from emulated targets, including a diffuse target having a plurality of scattering centers, in response to a frequency-modulated continuous-wave (FMCW) radar signal transmitted by a radar under test, the method comprising:
receiving the FMCW radar signal from the radar under test, the FMCW radar signal having radar signal frequencies linearly modulated between a first frequency and a second frequency;
generating a noise-like signal having frequencies within predetermined frequency limits, and a spectral shape such that amplitudes of the noise-like signal vary in a predetermined manner with respect to the frequencies, for emulating the diffuse target;
providing a frequency offset signal based on at least the noise-like signal;
mixing the frequency offset signal with the received FMCW radar signal to provide a return signal comprising an emulated echo signal reflected from the diffuse target; and
transmitting the return signal to the radar under test.

10. The method of claim 9, wherein the amplitudes vary inversely with respect to the frequencies of the noise-like signal according to a function of $1/f^2$, $f$ being instantaneous frequency of the noise-like signal.

11. The method of claim 9, wherein the amplitudes vary inversely with respect to distances (R) to scattering centers of the diffuse target according to a function of $1/R^2$.

12. The method of claim 9, wherein the frequencies of the noise-like signal are generated pseudo randomly.

13. The method of claim 9, wherein scattering centers of the diffuse target comprise emulated precipitation and/or emulated road clutter.

14. The method of claim 9, wherein mixing the frequency offset signal with the received FMCW radar signal comprises suppressing one of an upper mixing product or a lower mixing product.

15. The method of claim 14, wherein the lower mixing product is suppressed when the first frequency of the linearly modulated radar signal frequencies is greater than the second frequency, and
wherein the upper mixing product is suppressed when the first frequency of the linearly modulated radar signal frequencies is less than the second frequency.

16. The method of claim 14, further comprising:
generating tone signal comprising a tone at a frequency within the predetermined frequency limits, and an amplitude, for emulating a non-diffuse target,
wherein providing the frequency offset signal comprises summing the tone signal and the noise-like signal, and
wherein the return signal provided by mixing the frequency offset signal with the received FMCW radar signal further comprises an emulated echo signal reflected from the diffuse target.

17. The method of claim 9, further comprising:
generating a tone signal comprising a tone at a frequency within the predetermined frequency limits, and an amplitude, for emulating a non-diffuse target;
mixing the tone signal with the received FMCW radar signal to provide an emulated echo signal reflected from the non-diffuse target; and
transmitting the emulated echo signal reflected from the non-diffuse target to the radar under test.

18. A system for emulating echo signals in response to a frequency-modulated continuous-wave (FMCW) radar signal transmitted by a radar under test, the system comprising:
   a frequency offset transceiver comprising a receiver configured to receive the FMCW radar signal from the radar under test, a transmitter configured to transmit a return signal to the radar under test, and a mixer, wherein the FMCW radar signal has frequencies linearly modulated between a first frequency and a second frequency; and
   a signal generator configured to:
      generate a noise-like signal for emulating a diffuse target, the noise-like signal having frequencies within a predetermined band limit, and having a spectral shape such that amplitudes of the noise-like signal vary in a predetermined manner with respect to the frequencies;
      generate a tone signal for emulating a non-diffuse target, the tone signal having at least one frequency tone within the predetermined band limit, the at least one frequency tone have a frequency indicating to a distance to the non-diffuse target from the radar under test and an amplitude indicating the distance to the non-diffuse target from the radar under test and a radar cross section (RCS) of the non-diffuse target; and
      sum the noise-like signal and the tone signal to provide a frequency offset signal; and
   a controller programmed to control the signal generator to generate the noise-like signal based on desired characteristics of the diffuse target and the tone signal based on desired characteristics of the non-diffuse target,
   wherein the mixer of the frequency offset transceiver mixes the FMCW radar signal and the frequency offset signal to provide the return signal, and wherein the return signal includes an emulated echo signal of the diffuse target and another emulated echo signal of the non-diffuse target.

19. The system of claim 18 wherein the mixer is further configured to suppress one of an upper mixing product or a lower mixing product of the mixer.

20. The system of claim 19, wherein mixer suppresses the lower mixing product when the first frequency of the linearly modulated radar signal frequencies is greater than the second frequency, and wherein the receiver suppresses the upper mixing product when the first frequency of the linearly modulated radar signal frequencies is less than the second frequency.

* * * * *